US008636558B2

(12) United States Patent
Eyzaguirre et al.

(10) Patent No.: US 8,636,558 B2
(45) Date of Patent: Jan. 28, 2014

(54) INTERACTIVE TOY AND ENTERTAINMENT DEVICE

(75) Inventors: Adrianna Maria Eyzaguirre, London (GB); Peter John Hodges, London (GB)

(73) Assignee: Sony Computer Entertainment Europe Limited (GB)

(*) Notice: Subject to any disclaimer, the term of this patent is extended or adjusted under 35 U.S.C. 154(b) by 398 days.

(21) Appl. No.: 12/593,013

(22) PCT Filed: Apr. 30, 2008

(86) PCT No.: PCT/GB2008/001511
§ 371 (c)(1),
(2), (4) Date: Feb. 4, 2010

(87) PCT Pub. No.: WO2008/132486
PCT Pub. Date: Nov. 6, 2008

(65) Prior Publication Data
US 2010/0167623 A1 Jul. 1, 2010

(30) Foreign Application Priority Data
Apr. 30, 2007 (GB) .................................. 0708357.9

(51) Int. Cl.
*G06F 17/00* (2006.01)
(52) U.S. Cl.
USPC ........................................................ 446/330
(58) Field of Classification Search
USPC ...................................... 446/330, 476, 75, 76
See application file for complete search history.

(56) References Cited

U.S. PATENT DOCUMENTS

| 4,846,693 A | 7/1989 | Baer |
| 4,923,428 A | 5/1990 | Curran |

(Continued)

FOREIGN PATENT DOCUMENTS

| EP | 1776990 | 4/2007 |
| WO | 99/17854 | 4/1999 |

(Continued)

OTHER PUBLICATIONS

International Search Report, PCT/GB2008/001518, mailed Apr. 8, 2008.

(Continued)

*Primary Examiner* — Ronald Laneau
(74) *Attorney, Agent, or Firm* — Lerner, David, Littenberg, Krumholz & Mentlik, LLP (57) ABSTRACT

An entertainment system comprises an entertainment device and an interactive toy. The entertainment device comprises a wireless receiver arranged in operation to receive data descriptive of the physical capabilities of an interactive toy from an interactive toy, processing means to generate interaction signals, and a wireless transmitter arranged in operation to transmit interaction signals to the interactive toy, and in which the generated interaction signals are responsive to the data descriptive of the physical capabilities of the interactive toy. The interactive toy comprises a wireless receiver arranged in operation to receive a query signal requesting information about physical capabilities of the interactive toy, data provision means for providing data descriptive of the capabilities of the interactive toy, and a wireless transmitter arranged in operation to transmit the data descriptive of the physical capabilities of the interactive toy in response to the query signal. The entertainment device is arranged in operation to transmit interactive control data to the interactive toy responsive to media content being played by the entertainment device, the interactive control data being further responsive to physical capabilities of the recipient interactive toy previously transmitted from the interactive toy to the entertainment system.

11 Claims, 7 Drawing Sheets

(56) References Cited

U.S. PATENT DOCUMENTS

| | | | |
|---|---|---|---|
| 5,636,994 | A | 6/1997 | Tong |
| 5,752,880 | A | 5/1998 | Gabai et al. |
| 5,977,951 | A | 11/1999 | Danieli et al. |
| 6,012,961 | A | 1/2000 | Sharpe et al. |
| 6,238,262 | B1 | 5/2001 | Pracas |
| 6,309,275 | B1 | 10/2001 | Fong et al. |
| 6,317,714 | B1 | 11/2001 | Del Castillo et al. |
| 6,319,010 | B1 | 11/2001 | Kikinis |
| 6,617,503 | B2 | 9/2003 | Geopfert |
| 6,641,454 | B2 * | 11/2003 | Fong et al. ............ 446/297 |
| 6,773,344 | B1 | 8/2004 | Gabai et al. |
| 6,949,003 | B2 * | 9/2005 | Hornsby et al. ............ 446/484 |
| 7,033,243 | B2 * | 4/2006 | Hornsby et al. ............ 446/484 |
| 7,131,887 | B2 * | 11/2006 | Hornsby et al. ............ 446/484 |
| 7,137,861 | B2 | 11/2006 | Carr et al. |
| 7,248,170 | B2 | 7/2007 | DeOme et al. |
| 7,439,699 | B1 | 10/2008 | Earnest |
| 7,614,958 | B2 * | 11/2009 | Weston et al. ............ 473/62 |
| 7,749,089 | B1 * | 7/2010 | Briggs et al. ............ 472/136 |
| 7,818,400 | B2 | 10/2010 | Wood et al. |
| 7,853,645 | B2 | 12/2010 | Brown et al. |
| 7,878,905 | B2 * | 2/2011 | Weston et al. ............ 463/39 |
| 7,945,547 | B2 | 5/2011 | Terashima et al. |
| 2001/0029147 | A1 | 10/2001 | Hornsby et al. |
| 2002/0123297 | A1 * | 9/2002 | Hornsby et al. ............ 446/484 |
| 2002/0177383 | A1 * | 11/2002 | Hornsby et al. ............ 446/175 |
| 2002/0193047 | A1 | 12/2002 | Weston |
| 2003/0027636 | A1 | 2/2003 | Covannon et al. |
| 2005/0154594 | A1 | 7/2005 | Beck |
| 2006/0234601 | A1 * | 10/2006 | Weston ............ 446/268 |
| 2006/0273909 | A1 | 12/2006 | Heiman et al. |
| 2007/0162628 | A1 | 7/2007 | Terashima et al. |
| 2013/0130587 | A1 * | 5/2013 | Cohen et al. ............ 446/175 |

FOREIGN PATENT DOCUMENTS

| | | |
|---|---|---|
| WO | 0051697 | 9/2000 |
| WO | 0150749 | 7/2001 |
| WO | 0158552 | 8/2001 |
| WO | 0169572 | 9/2001 |
| WO | 0169829 | 9/2001 |

OTHER PUBLICATIONS

Communication from corresponding EP Application No. 08737150, dated Jul. 2, 2010.

European Search Report issed on Jun. 17, 2011 in connection with corresponding European Appln. No. EP 11 15 9640.

International Search Report dated Aug. 4, 2008, from the corresponding International Application.

Examination Report from GB Application 0708357.9, dated Oct. 12, 2011.

International Preliminary Report on Patentability dated Jul. 24, 2009, for corresponding International Application PCT/GB2008/001511.

International Search Report dated Aug. 4, 2008, for corresponding International Application PCT/GB2008/001511.

Patents Act 1977: Combined Search and Examination Report under Sections 17 and 18(3) dated Aug. 23, 2007, for corresponding English Application No. GB0708357.9.

Patents Act 1977: Search Report under Section 17(6) (claims 58-63) dated Dec. 11, 2007 for corresponding English Application No. GB0708357.9.

Patents Act 1977: Search Report under Section 17(6) (claims 55-57) dated Dec. 11, 2007 for corresponding English Application No. GB0708357.9.

Patents Act 1977: Search Report under Section 17(6) (claims 43-54) dated Dec. 11, 2007 for corresponding English Application No. GB0708357.9.

Patents Act 1977: Search Report under Section 17(6) (claim 12) dated Dec. 11, 2007 for corresponding English Application No. GB0708357.9.

Patents Act 1977: Search Report under Section 17(6) (claims 25-42) dated Dec. 11, 2007 for corresponding English Application No. GB0708357.9.

Patents Act 1977: Error in Search Report (claims 1-11, 13-22 and 24) dated Sep. 11, 2007, for corresponding English Application No. GB0708357.9.

"Microsoft launches actimates early learning system at toy fair: unique realmation animation technology makes interactive barney ideal learning partner", Feb. 7, 1997, pp. 1-3, https://www.microsoft.com/presspass/press/1997/feb97/actimate.mspx.

Erik Strommen, "When the interface is a talking dinosaur: learning across media with actimates barney", Proceedings of ACM CHI,98 (Apr. 18-23, 1998, Los Angeles, CA, Conference on Human Factors in Computing Systems, (ACM/SIGCHI, New York), 288-295.

Steve Behrens, "We'll look back on this old barney: an early input-output gizmo you could hug", Jan. 19, 1998, pp. 1-4, http://www.current.org/tech/tech801b.html.

Michael Kaminsky, et al, "Sweetpea: software tools for programmable embodied agents", http://sandbox.xerox.com/dourish/sweetpea.pdf, dated on May 1999.

* cited by examiner

INTERACTIVE TOY AND ENTERTAINMENT DEVICE

This invention relates to an interactive toy and an entertainment device.

Interactive toys are known in the prior art. The Microsoft® ActiMates® system launched in 1997 featured an interactive toy based upon the children's TV character Barney the dinosaur (see https://www.microsoft.com/presspass/press/1997/feb97/actimate.mspx). By default the interactive Barney has a 2000-word vocabulary and a range of physical movements driven by actuators.

Interaction with a child is provided by twelve in-built games that can be selected by squeezing a paw containing a pressure sensor (i.e. a button). The toy also features pressure sensors in the feet and a light sensor in the eyes.

In addition, the interactive Barney can interact with video and computer programmes.

Video tapes of Barney's TV programmes that comprise encoded data can be played on a conventional video player. Optionally, a radio transmitter is attached between the video player and the output lead to the television that extracts the encoded data and transmits it to the toy. When receiving such data from the video programme, the interactive Barney is prompted to comment on what is happening on screen, ask questions about the programme and engage in related activities.

Similarly, a radio transmitter can be attached to the midi port of a personal computer. In this case, games for children are run by the computer and the Barney toy can act as an output interface for the games by commenting, prompting and encouraging a child.

Other interactive toys exist such as Mattel's 'Talk With Me Barbie', which uses software to wirelessly load a Barbie doll with topics of conversation and selected names such as those of the owner. Once loaded, the doll can be carried around in a conventional manner (see http://sandbox.xerox.com/dourish/sweetpea.pdf).

The use of interactive toys such as the ActiMates Barney as a more general interface with electronic devices has also been explored (see again http://sandbox.xerox.com/dourish/sweetpea.pdf). In this context, the input sensors (pressure and light) have also been used as input controls for other devices, either singly or in simple combinations.

However, the success of such interactive toys depends on there being a good range of titles for the toy to interact with both at launch and into the future. It is also dependent on whether parents will buy a comparatively expensive toy whilst believing it will require further purchases of videos to maintain their child's interest.

The present invention aims to mitigate or alleviate the above problem.

In a first aspect of the present invention, an entertainment device comprises: a wireless receiver arranged in operation to receive data descriptive of the physical capabilities of an interactive toy from an interactive toy, processing means to generate interaction signals, and a wireless transmitter arranged in operation to transmit interaction signals to the interactive toy, and in which the generated interaction signals are responsive to the data descriptive of the physical capabilities of the interactive toy.

In a second aspect of the present invention, an interactive toy comprises: a wireless receiver arranged in operation to receive a query signal requesting information about physical capabilities of the interactive toy, data provision means for providing data descriptive of the capabilities of the interactive toy, and a wireless transmitter arranged in operation to transmit the data descriptive of the physical capabilities of the interactive toy in response to the query signal.

In a third aspect of the present invention, an entertainment system comprises an entertainment device in accordance with the first aspect and an interactive toy in accordance with the second aspect, in which the entertainment device is arranged in operation to transmit interactive control data to the interactive toy responsive to media content being played by the entertainment device, the interactive control data being further responsive to physical capabilities of the recipient interactive toy previously transmitted from the interactive toy to the entertainment system.

Advantageously, the above three aspects therefore allow a wide variety of interactive toys to interact with common media content by selecting interactive commands suitable to the toys own characteristics.

Further respective aspects and features of the invention are defined by the appended claims.

Embodiments of the present invention will now be described by way of example with reference to the accompanying drawings, in which.

In a summary embodiment of the present invention, an interactive toy is sold together with a data disk that contains identification codes for DVDs, Blu-ray discs etc., of popular children's programmes and films. This data can be installed on an entertainment device. In the resulting interactive system, when the entertainment device then plays such a film or programme, it is identified using these codes and a corresponding sequence of interactive commands is accessed. This sequence is specific to the film, and associates interactive commands with the timestamp of the film disk. Such commands are then transmitted to the interactive toy. In this way the interactive toy can interact with a large number of popular titles already found in the family's collection of films. Future titles can optionally comprise interactive commands as part of the disk content. Further, the toy can inform the entertainment device of its characteristics, such as its physical abilities or depicted gender, so that the entertainment device can select commands appropriate to the toy. In this way, toys can be introduced over time with varying specifications that nevertheless maintain a baseline level of compatibility with available and future titles.

An entertainment device in accordance with an embodiment of the present invention is now described with reference to FIGS. 1, 2 and 3.

Figure 1:
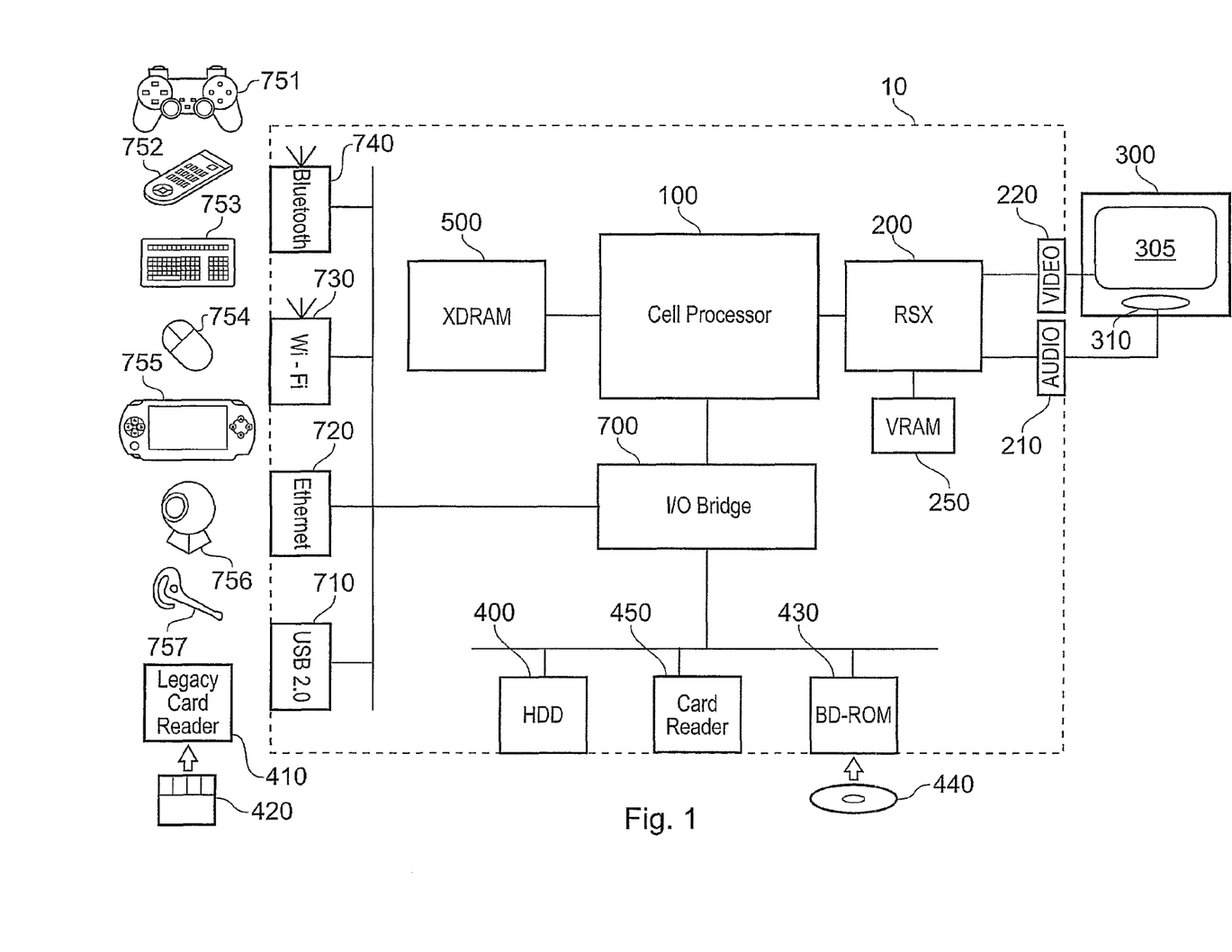
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, acting as a non-volatile rewritable storage medium and accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting of up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® (PSP®) entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

It will therefore be appreciated that the interactive toy may be readily arranged to communicate with a PS3 via either a WiFi or Bluetooth wireless link.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
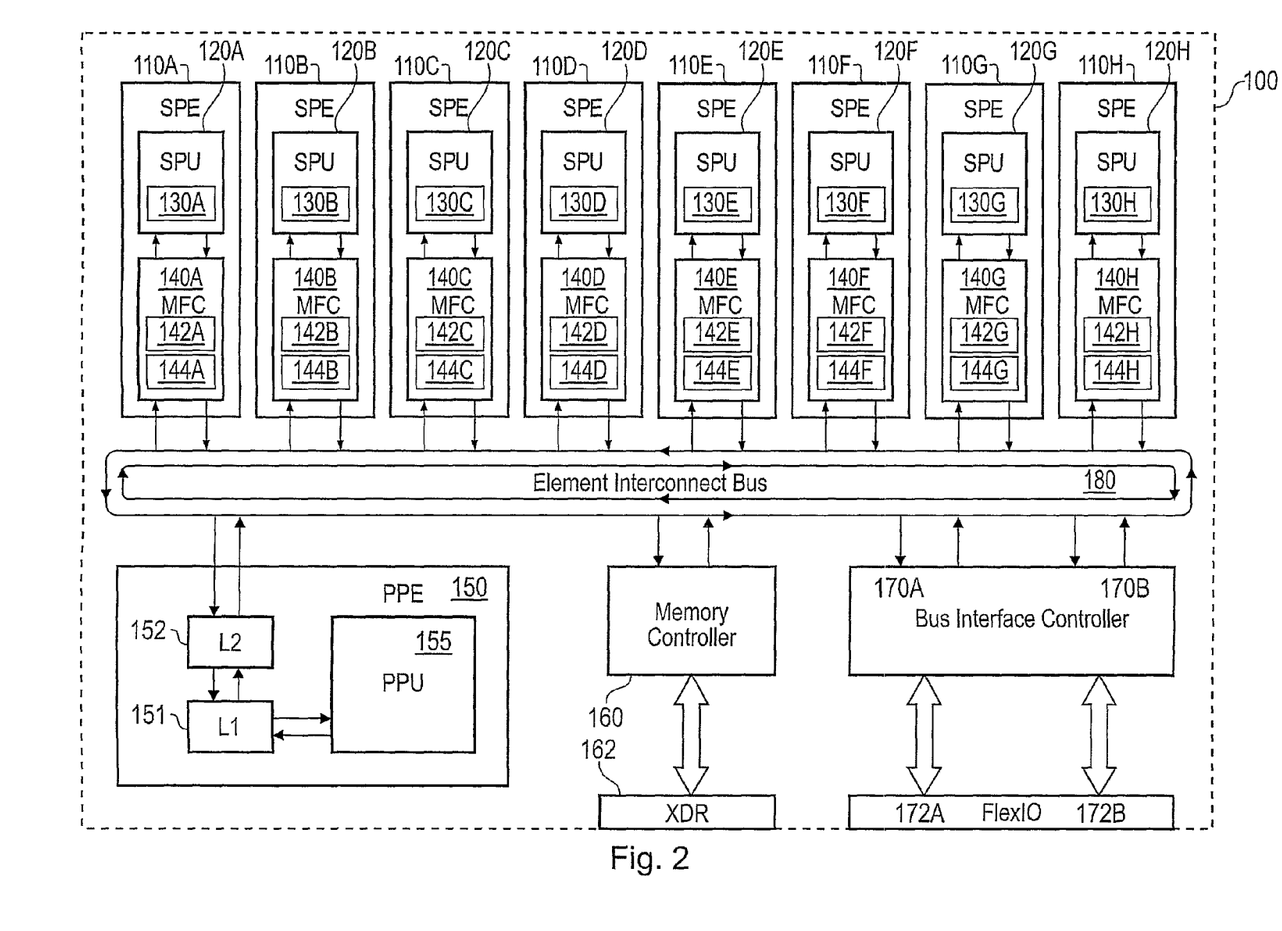
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totaling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous BIB bandwidth for 12 slots is therefore 96 B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
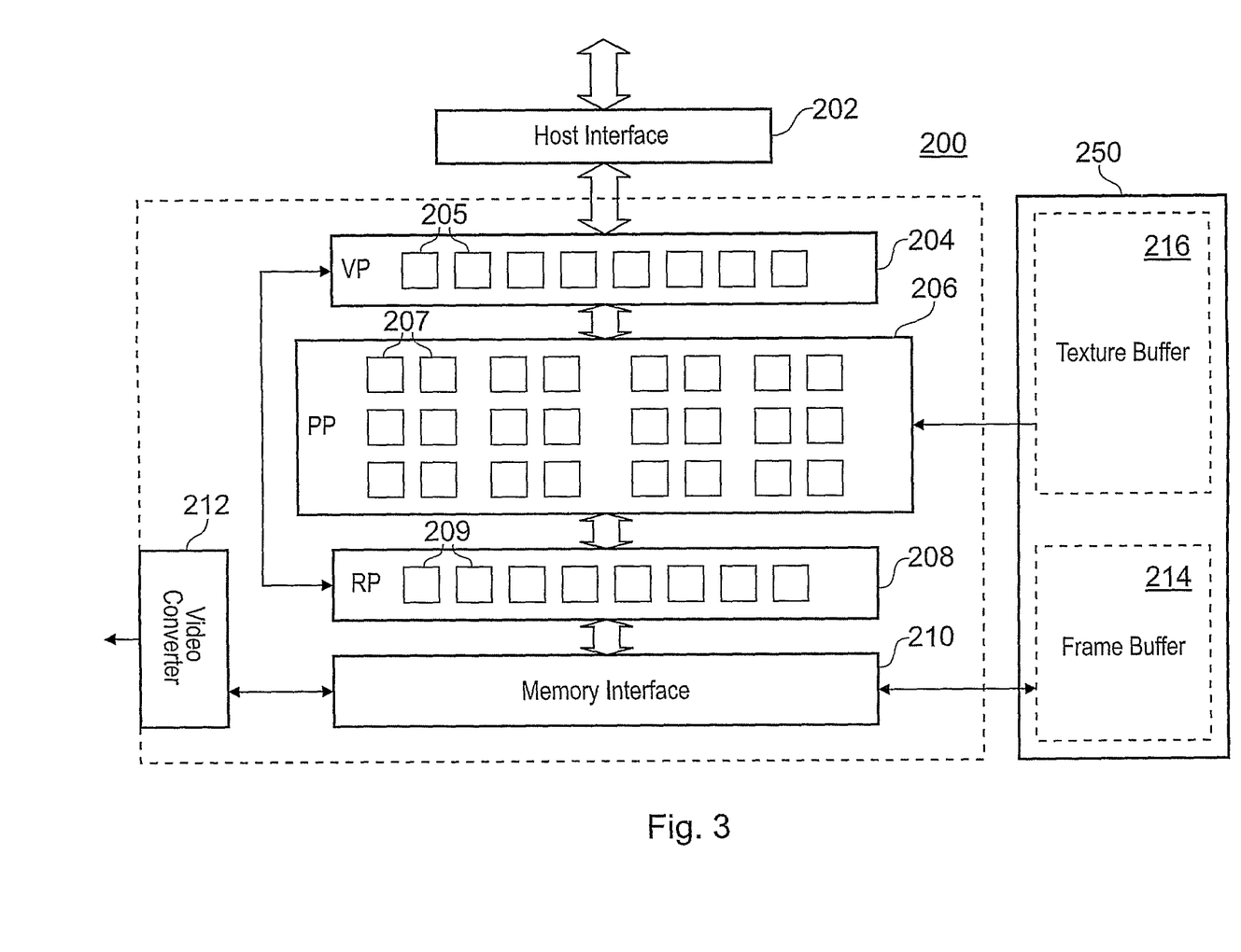
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B.

The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio, data or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4:
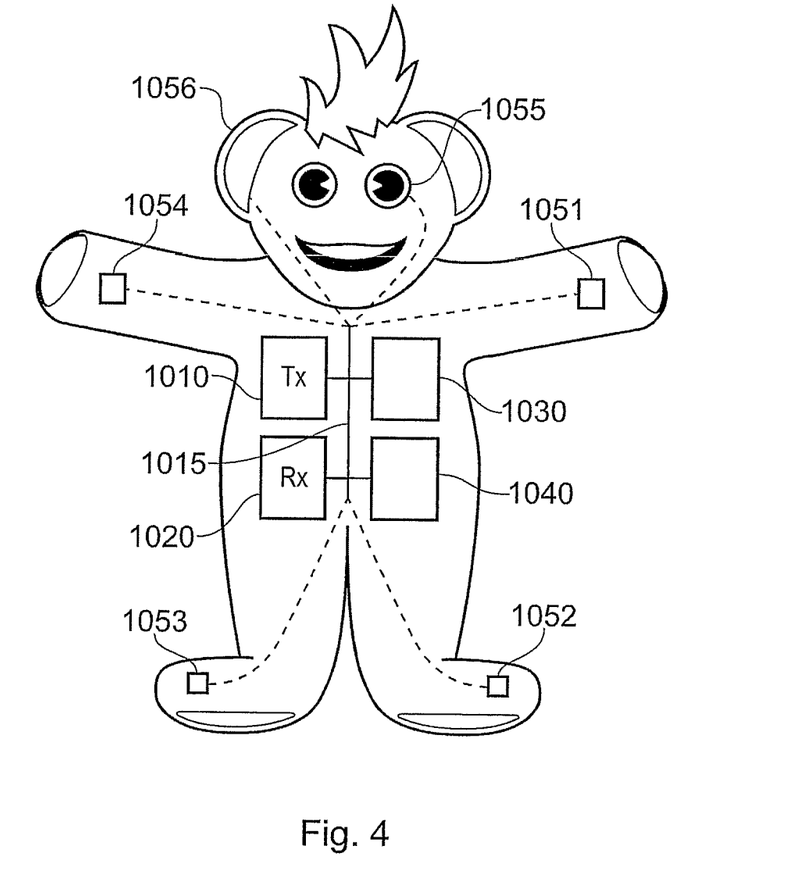
FIG. 4 is a schematic diagram of an interactive toy in accordance with an embodiment of the present invention.

Referring now to FIG. 4, in an embodiment of the present invention an interactive toy comprises a wireless transmitter 1010, a wireless receiver 1020 (typically combined with the transmitter as a wireless transceiver), a processor 1030 and a memory 1040, interconnected by a communications bus 1015. In addition, pressure sensors such as push buttons 1051-1054 (also connected to the bus 1015) are fitted in the paws and feet of the toy. In other form factors the placement of such sensors, if included, would clearly depend on the nature of the toy (for example, one or more sensors may be placed in the torso or face of a toy). Optionally, the toy may also comprise one or more light or image sensors 1055 such as photo resistors or CCDs, one or more motion sensors and/or one or more audio sensors 1066 such as mono or stereo microphones. The toy may be as a plush toy as shown, but alternatively may be any suitable form factor such as a toy vehicle.

The toy is powered by primary (non-rechargeable) or, preferably, secondary (rechargeable) cells (not shown).

Not shown in FIG. 4, in an embodiment of the present invention the toy comprises one or more actuators for generating motion in one or more limbs, and/or the head or torso. If applicable, wheels or further potentially posable elements of the toy such as a tail, crest or other appendage may also be moved in a similar manner.

Likewise, in an embodiment of the present invention the toy comprises one or more actuators for generating motion of the mouth, eyes and/or ears.

In an embodiment of the present invention the toy comprises a vibration motor, and/or a refillable liquid reservoir and a liquid release means (for example to generate tears).

In an embodiment of the present invention the toy comprises one or more loudspeakers and/or one or more lights.

Likewise, the processing capabilities of interactive toys may vary. For example, in addition to sensing audio signals, a toy may comprise firmware capable of voice recognition and/or speech recognition, enabling it to identify its owner and/or accept one or more spoken commands.

As a similar example, in addition to sensing light levels a toy may comprise firmware capable of image acquisition or image compression, or be capable of image recognition (using image recognition techniques which are, of themselves, known) so as to recognise its owner or other items that come with it when sold.

Again, a toy may be capable of reproducing audio samples and/or comprise a predetermined vocabulary of words, but may also comprise firmware capable of reproducing MIDI data as music, and/or of speech synthesis. Other examples of toy modality will be apparent to a person skilled in the art.

It will be appreciated that different interactive toys may be designed for different age ranges. For example, toys suitable for 1-3 year-olds are likely to have fewer complex or potentially breakable actuator systems than those suitable for 5-7 year olds, whilst toys suitable for a teenage or adult audience may be highly sophisticated.

In addition, as seen above such interactive toys can be licensed likenesses of well known children's TV characters (such as Barney), and it therefore may be desirable to show character specific behaviour. Likewise toys may have different apparent genders and therefore it may be desirable to show different gender behaviour, for example in terms of reaction or in terms of voice data used.

Thus in principle a wide range of interactive toys with very different physical capabilities can be envisaged, depending both on form factor and on cost.

A common capability, however, is that these toys interact with media or software on an entertainment device such as the PS3 in a manner generally similar to the Barney toy discussed previously. In a simple and non-limiting example, an interactive toy may make the following interactions:

| On-screen event | Interaction by toy |
|---|---|
| Character X appears | Toy says 'Hello X!' |
| A box of six eggs is visible | Toy says 'Can you see six eggs?' |
| Characters dance to music | Toy moves |
| Programme ends | Toy says 'Goodbye!' |

It will be appreciated that there is a challenge to enable such a diverse range of interactive toys to each interact appropriately with common published media content such as a video or computer program playable by the PS3.

In an embodiment of the present invention, when a PS3 is loaded with a disk 440 such as a DVD or Blu-Ray disk suitably formatted to comprise both content data (movies/videos, games etc) and supplementary data such as an interaction track to accompany the video, the PS3 recognises that the disk provides interactive capabilities for interactive toys and broadcasts a polling signal via the Bluetooth link 740, the WiFi link 730 or both, requesting an acknowledgement from any interactive toy within range.

An interactive toy in accordance with an embodiment of the present invention, upon receiving this signal, accesses a list of characteristics of the toy stored in memory and transmits descriptive data representing the list back to the PS3. The transmission of data descriptive of the characteristics of the interactive toy may be part of the initial handshaking process or may be a subsequent, separate interrogation by the PS3. Alternatively, the interactive toy may initiate the communication, either by periodic signalling or when an appropriate input is given by the user. However, this latter option may adversely affect battery life. This discovery process between the PS3 and the toy may use internet protocols and resemble a client/server or peer to peer query process, and need not be limited to an initial handshake and subsequent interaction commands. For example, periodic connection maintenance signals can be used to determine whether the toy is still present. Conversely, these signals can be used by the toy to determine if the PS3 has been switched off or if the toy has been carried out of range, and so should revert to a stand-alone mode. A disconnection signal from either the PS3 or toy can be used to explicitly end communications.

In an embodiment of the present invention, the discovery process utilises a query language, for example implemented in XML, which provides a protocol for the publication and negotiation of functions and facilities between the PS3 and the toy. Functions shared between the PS3 and the toy may use a common intermediate language in a manner similar to Microsoft's® .NET® framework. In this way a standardised query process may be implemented for a number of different toys.

In an embodiment of the present invention, the descriptive data returned to the PS3 by the toy may comprise one or more of the following characteristics:

i. physical capabilities of the interactive toy;
ii. target age-range of a user of the interactive toy, if any;
iii. licensing type of the interactive toy, if any;
iv. personality type of the interactive toy, if any;
v. the apparent gender of the toy, if any;
vi. the apparent age of the toy, if any;
vii. the name of the toy; and
viii. the physical appearance of the toy.

The physical capabilities of the toy may be transmitted as a checklist (e.g. a binary sequence), but may alternatively or in addition be transmitted as a type code, such as 'jointed humanoid' or '4-wheeled vehicle', from which certain physical characteristics can be inferred by looking up data pre-stored on the PS3.

In addition, physical capabilities can also encompass system capabilities, such as available RAM and processing power. These may determine the size and order of any vocabulary (or additional vocabulary) transmitted to the toy, or the complexity of executable instructions sent to the toy.

The target age range of the toy may take the form of a lower and upper age value, and/or an age type, such as 'baby', 'toddler', 'pre-school', 'school', 'teenage', 'adult' or 'all'.

The target age range can be used by the PS3 to determine different interactive content for different age groups from the media disk. For example, if the toy is targeted at toddlers, it would be more appropriate to use a few simple words and short phrases repetitively and in close association with on-screen events, whilst a toy targeted at 5 years-olds can use more sophisticated commentary, or perhaps ask questions or suggest activities that refer to events in a story from earlier on in a play session. Such alternative interactive content can be stored on the media disk in parallel if it supports multiple age groups. Alternatively, some or all of the stored interactive content may be defined as appropriate for all age groups.

Similarly, a target gender for a toy may be used to select different interactive content for boys and girls, and, where interaction does not utilise voice data pre-stored on the toy, it can be used to select appropriate voice data for upload or streaming to the toy from the PS3.

The licensing type of the toy informs the PS3 of any restrictions imposed as a consequence of a licensing deal. For example, a toy licensed to resemble the appearance of one TV character may be restricted to only interact with media disks featuring that character or other characters sharing a common license, or may be generally free to interact with media disks except for those a producer whose content the licensing company does not want associated with their licensed toy, or conversely only work with disks of a specified producer. Alternatively the toy may be free to interact with any suitably enabled media disk. Optionally any or all of the above may be further licensed to a specified geographical region.

To provide an open-ended system, in an embodiment of the present invention the license information comprises keyword based data for inclusion and/or exclusion entries, and media disks contain descriptors such as main character, film name, licensing company, age certificate etc. Where the inclusion keywords intersect, the toy interacts with the media. Where the exclusion keywords intersect, the toy does not. A key word such as 'all' is used to indicate that there is no license restriction in a particular category.

Alternatively or in addition, digital certificates may be used, wherein one or more certificates of the toy and on the media disk are compared to see if the toy is licensed to interact with the disk (or vice versa).

As a further option, where a toy is not licensed to interact fully with a media disk, the PS3 can issue generic interaction instructions that follow the spirit of the interactive content on the disk, allowing the toy for example to give generic positive and negative comments as appropriate. This avoids frustration by the user, who as a child is likely to be unaware of and unconcerned by licensing issues.

Thus alternatively or in addition, rather than sending a specific instruction to perform a specific action, the PS3 could send a more abstract instruction such as 'act surprised' that is interpreted by the toy according to the resources it has available—for example, the ability to throw up its arms, or to select an appropriate phrase from a built in vocabulary. More generally, such a layer of abstraction can simplify and reduce the amount of supplementary data needed, as it allows each type of toy to react in character without the need for different supplementary data tracks. A number of such basic responses could be codified and pre-programmed within suitably enabled toys.

The so-called 'personality type' of the toy allows toys that have otherwise similar characteristics to be differentiated in use. This reduces the potential for a chorusing effect where two or more toys interacting with the same video output an identical response. Such behaviour is likely to be seen as creepy or mechanical by a child.

The personality type can simply be an identifying number (such as a make/model or serial number) transmitted to the PS3 that serves to differentiate devices. A challenge/response protocol may thus be used to confirm that the intended toy has received the interactive command by associating the command with the identifying number. Alternatively or in addition, such a protocol could associate several identifying numbers with an interaction command to deliberately orchestrate a chorusing effect where this would be appropriate or amusing, for example making otherwise differently behaving toys act together if the media programme invites the viewers to all sing a song together. Other deliberate orchestrations could include toys acting as conscience and devil's advocate suggesting different courses of action for the user. In this way, the PS3 can act as puppeteer for more than one toy at the same time.

Alternatively or in addition, a value corresponding to a more human concept of personality may be used. In this latter case, the personality type can be used by the PS3 to select or deselect interactive commands according to personality type. For example, a fluffy toy may be defined as "timid and shy", and so react in a different way to a soldier-style toy in response to the same film, despite similar physical capabilities and target age groups. The personality type and gender type may be combined as a range of personality options.

In any event, in an embodiment of the present invention the PS3 can assign an interaction to one of a plurality of connected toys rather than all, or assign different interactions to each where available, optionally according to their personality or gender type if this provides an indication of the type of interaction appropriate to the toy, as noted above. Alternatively, in an embodiment of the present invention the PS3 includes a personality code along with interaction signals, allowing the interactive toy to determine whether to carry out that interaction according to its own personality. This may be an absolute decision, or bias a probability of carrying out the interaction. In the case where the toy determines whether to respond according to personality or gender, when an interaction does not contain a personality or gender aspect, the code may be omitted or may be a neutral code, depending on implementation.

Optionally, an interactive toy can be configured to express a different personality, for example by appropriate use of the input sensors 1051-1056 or via a configuration menu provided by the PS3. This allows the user to configure the toy to suit their mood, and/or to better differentiate an otherwise identical pair of toys. For example, a profile can be generated by the selection of different traits by the user (such as age, gender, happiness, assertiveness etc). In this latter case, the PS3—or the toy—can, where available, select one from among a set of parallel interaction instructions that best fits the user's selected personality profile.

Alternatively or in addition, an interactive toy can transmit a suppression signal when it is about to interact with a video, preventing another toy from making the same response. Such a signal may prompt a return signal overriding the first, for example, where one toy has responded more frequently than another. However, such an approach will have a negative impact on battery life. Alternatively, a toy may require a user to interact with it at least once in order to remain in communication with the PS3; a consequence of this is that a second toy will fall silent unless actively engaged with. Conversely, where two toys attempt to handshake with the PS3, the second toy to respond may be excluded, unless it is interacted with during playback of the media disk. At this point the second toy may join in the interactions or replace the first toy as the main focus of interaction.

It will be appreciated that the predictability of interactions by the toy is generally configurable, as outlined above. Consequently in some circumstances it may be appropriate for interaction instructions to be obeyed apparently at random (for example in a popular film with a high density of interactions available), whilst in other circumstances they should be obeyed reliably and repeatedly (for example in an educational context).

The name of the toy can be transmitted from the interactive toy to the PS3 as a keyword, to provide flexibility with future published media disks. This enables the PS3 to identify any additional available interactive content provided that is specific to the corresponding character on screen (so that, for example, the first time the character appears on screen the toy can say 'Look, that's me!'). Such content may be limited to the character itself, or to comments about other aspects of the video that are uniquely 'in character', such as 'I think [character X] likes me'.

In addition, a popular character toy may have its own voice data included on the disk so that additional comments transferred or streamed to the toy use the appropriate sounding voice.

To limit the scope for so-called 'hacking' of the toys, for example to subvert the use of such well known character voices in a manner that may harm the reputation of a product or license, the data included in the toy and transmitted to and from the toy may be encrypted.

It will be appreciated from the above disclosure that media disks can comprise multiple supplementary data tracks, for example directed to different personalities, abilities, license models and appearances of toys. Moreover, any or all of this supplementary data could include a high density of interactive comments and movements. Therefore, optionally the PS3 could select whether to actually use any particular one on a probabilistic basis so as to provide some variation in response over repeated viewings. Moreover, the toy or PS3 could have a setting to vary this probability to control the level of interaction generated—for example if the whole family are watching a movie they may only want the occasional comment from a toy, whereas if the child is watching alone they may want a high density of comment. This could be set by suitable interaction with the toys' sensors or via an on-screen menu generated by the PS3. Alternatively or in addition if a lower level of interaction is selected, the PS3 could inhibit the toy from making any interactive comment or action for, say, a period of N seconds or minutes after the last interaction. This level of interaction could be determined as a total for all toys present if there is more than one.

Alternatively or in addition, a mute command may be provided, rendering the toy passive. This may take the form of a remote control (typically held by a parent) that directly communicates with the toy, or a suitably enabled Sony Playstation Portable® device, or alternatively a remote control or gamepad of the PS3 used for such a purpose, causing the PS3 to either no longer issue interaction commands or to send a mute command to one or more toys.

The physical appearance of the toy can be provided as one or more graphical images stored in the toy's memory and transmitted to the PS3. This enables the PS3 to display the toy on screen (for example for on a menu page or in a tutorial), even if the toy is manufactured after the current media disk was published. Optionally, an image map may also be provided tagging portions of one or more images with corresponding data about sensors/movement/outputs, so that a tutorial can be configured to the toy, for example correctly highlighting the limbs that have pressure sensors whilst not making reference to light sensors if these do not exist on the toy. In addition, the apparent age of the toy may also be transmitted if appropriate; for example, the toy may resemble an infant, a child or an adult, so affecting the appropriate comments and interactions it makes. This can also be included as part of a personality profile along with personality type and gender.

Using the data descriptive of the characteristics of the toy transmitted from the interactive toy to the PS3, the PS3 can generate a mapping of sensor activation signals from the toy to controls for controlling one or more aspects of the PS3 (for example control of software run on the PS3 and the content of the media disk).

Alternatively, the PS3 could transmit this mapping as configuration data to the toy, so that the toy stores in memory a mapping from its sensor activations to appropriate command signals and then transmits the actual command signals, thereby for example mimicking appropriate key presses of game controller 751 and/or remote control 752.

In either case, such a mapping could prioritize functions according to available sensors. For example, a simple toy comprising only one pressure sensor could still be used as a play/pause control. By contrast, a toy with pressure sensors in all four limbs and the torso could be used to play/pause, fast-forward/rewind and to chapter skip in both directions or to turn the volume of the video up or down. Thus the PS3 maintains a list of functions in priority order and maps them in this order. The order may be global and/or by sensor type, thereby giving preference to assignment of orders according to the most appropriate sensor.

A tutorial utilising a graphic image of the toy may consequently be of help in identifying for the user how the controls map onto the toy. Alternatively, the toy could give instructions itself, such as 'press my tummy to pause the film', by concatenating the sensor action ('press my tummy') with the associated action ('pause the film').

It will be appreciated that a toy can therefore also control the playback of the media content as part of its own interactive play; for example pausing playback to point out a particular feature, or rewinding the media to repeat a scene as part of a game. Similarly, media appropriately structured into chapters could be accessed selectively to form an interactive story controlled by the toy.

Alternatively or in addition, a toy could also simply signal that an interruption has occurred due to an interaction by the user. In this case, the user is not necessarily wishing to control playback, but just to interact with the toy. Following the interruption, the PS3 may wait for a resumption signal from the toy before resuming the transmission of interaction commands, or may respond by informing the toy about the likely mood of the user so it can select its own behaviour (for example, if it is a sad part of a film, the user may simply wish to hold the toy's hand, and not to trigger a jolly 'let's play a game!' type of response). More generally, this interruption signal allows the PS3 to determine what to do in response rather than being a direct control per se.

In addition to transmitting instructions to the interactive toy enabling it to interact with video or game content currently being shown on by the PS3, it can also transmit data for use when the toy is no longer in ongoing communication with the PS3.

As noted previously, an interactive toy can provide stand-alone functionality such as games, spoken phrases, songs and movement. Typically a variety of such games, songs, etc., will be built in at manufacture.

In an embodiment of the present invention, the interactive toy stores additional data transmitted from the PS3 in its memory that provides additional functionality for stand-alone behaviour. This data may include any or all of audio data, motion control data, and executable data. The memory used for the additional data may be volatile or non-volatile memory.

For example, audio data may be used to extend the toy's repertoire of spoken phrases in stand-alone mode and to include catchphrases from a recently viewed video, questions or commentary about the video or requests to play the video again. Alternatively or in addition, the audio data may comprise music from the video such as a signature theme.

Likewise, motion control data may be used to extend the toy's repertoire of actions, and may include instructions to mimic a pose or action associated with a character in the video, express an emotion applicable to the video or a subsequent activity, and/or dance moves to accompany music from the video.

Similarly, executable data may be used to extend the toy's repertoire of functions, for example associating dance moves with a certain tune or playing a new game using new speech data. Thus in some circumstances audio or motion data can be used as resources for new executable software on the toy, or it can be used as additional resources for existing executable software on the toy, or can be used by both types of executable software.

In an embodiment of the present invention, the data sent to the toy is responsive to the data descriptive of the characteristics of the toy previously transmitted by the interactive toy to the PS3. For example, in addition to audio samples, MIDI data could be transmitted to a toy that has indicated that it comprises a MIDI synthesiser. Similarly a larger set of vocabulary may be sent to a toy that has indicated it has a larger memory capacity or is capable of speech synthesis.

By this mechanism, the interactive toy can give the impression that it has remembered one or more videos that it has recently watched, and can engage the child with its recollections and themed games.

Optionally, this data can be overwritten or deleted each time the interactive toy enters into a communication mode with the PS3. Alternatively or in addition, the toy can be set to 'forget' the data after a predetermined period of time. This time limit may be in-built or may be defined by a retention duration value also transmitted by the PS3 along with the data itself. Optionally the retention duration may be different for different aspect of the data, so that for example the toy stops playing games themed on the video relatively quickly but may occasionally say catch phrases from it for a week or more after. This may also encourage the child to watch the video again to 'refresh' the toy's functionality.

In another embodiment of the present invention, the PS3 transmits a default range of interactive data that is tagged with information about the capabilities required to use individual interactive elements or sections in the data, and the processor 1030 of the toy compares the required capabilities with the list of characteristics of the toy stored in memory 1040 in order to determine whether any given interactive element can be used by the toy. If it cannot, then the toy does not respond to that respective element.

Whilst reference has been made herein to physical toys, the above principles similarly apply to virtual toys; for example a persistent character resident on a user's Playstation Portable, in the form of a pet or companion, may operate in a similar manner to the physical toys described herein. In this case, it will of course be appreciated that the communication means, processing power and virtual physical abilities of the virtual toy arise from the facilities and software of the PSP. Likewise, the physical sensors of the toys would instead be input devices of the PSP user interface.

As noted previously, for existing DVD, Blu-ray and other media disks 440 that do not have supplementary data tracks built-in, in an embodiment of the present invention an interactive toy can be accompanied by a data disk providing such supplementary data for popular existing titles.

Typically the data disk will install software and data on the PS3 so that the disk drive is vacated for use by media disks.

The installed software allows the PS3 to compare a media disk identification number with a list of supported media disks. Potentially several numbers may correspond with one film.

Alternatively or in addition, the PS3 can access an on-line server to identify the media disk in a similar manner, and optionally download the relevant data if not supplied on the disk.

The identification number may be a serial number if available, or may be generated from characteristics of the media disk. For example, a code may be generated based upon the number of chapters in the media disk and their respective durations; this tends to be different for different films and programmes, and is the basis of the Compact Disk Database (CDDB) system used to identify compact disks in applications such as Microsoft® Media Centre. Optionally the code can be augmented by one or more byte values take from predetermined positions on the media disk. Alternatively or in addition, a hash code for a media disk can be constructed; some or all of the disk data can be used to generate a hash code, which can be used to identify the media disk.

Clearly, any metadata on the media disk that serves to identify it, such as in an MP4 tag, may also act as identification data.

The data installed from the data disk also comprises interactive commands and resources for the supported films associated with timestamps for the relevant film. Thus for example, a film such as 'Finding Nemo'® could have a comment such as 'Look out for the shark!' that is triggered for use, say, 28 minutes and 32 seconds into the film.

Commentary may use copyrighted names and material relevant to the film, or may use generic comments (such as 'Look out for the shark') depending on whether such names and material have been released or licensed for use with the toy.

By using such a disk, an interactive toy can launch with an instant back-catalogue of popular children's films and programmes with which it can interact and which the child is likely to already own. In the future, disks with supplementary interaction data can be purchased in preference to those without. Such toy-enabled disks may provide a richer variety and greater amount of interaction as described previously herein when compared with that provided on a data disk, thereby providing a premium content for the purchaser.

Conversely, a market can also be created for data disks. For example, providing a disk giving a high density of commentary and interaction for the Tellytubby® back catalogue would breathe life into an existing collection and may be popular.

Thus two types of disk are envisaged; a media disk comprising video material and supplementary data providing interaction with that video material, and a data disk comprising data to identify a plurality of other, standard media disks, and for each supported standard media disk interaction data associated with respective time stamps.

Alternatively or in addition in an embodiment of the present invention, similar identity code lists and sequence data can be held on a server and accessed by the PS3 via a network connection. A range of titles may be enabled for interaction in this way for free, whilst other titles may be enabled following a payment via an on-line purchase scheme. Likewise, actual media content may be provided in this manner.

Figure 5:
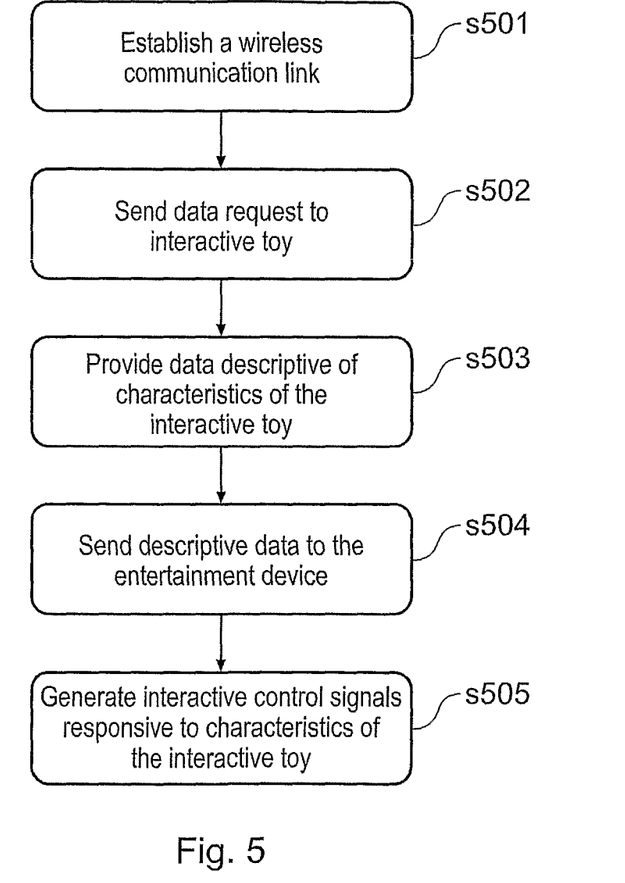
FIG. 5 is a flow diagram of a method of interaction between an entertainment device and an interactive toy in accordance with an embodiment of the present invention.
Figure 6:
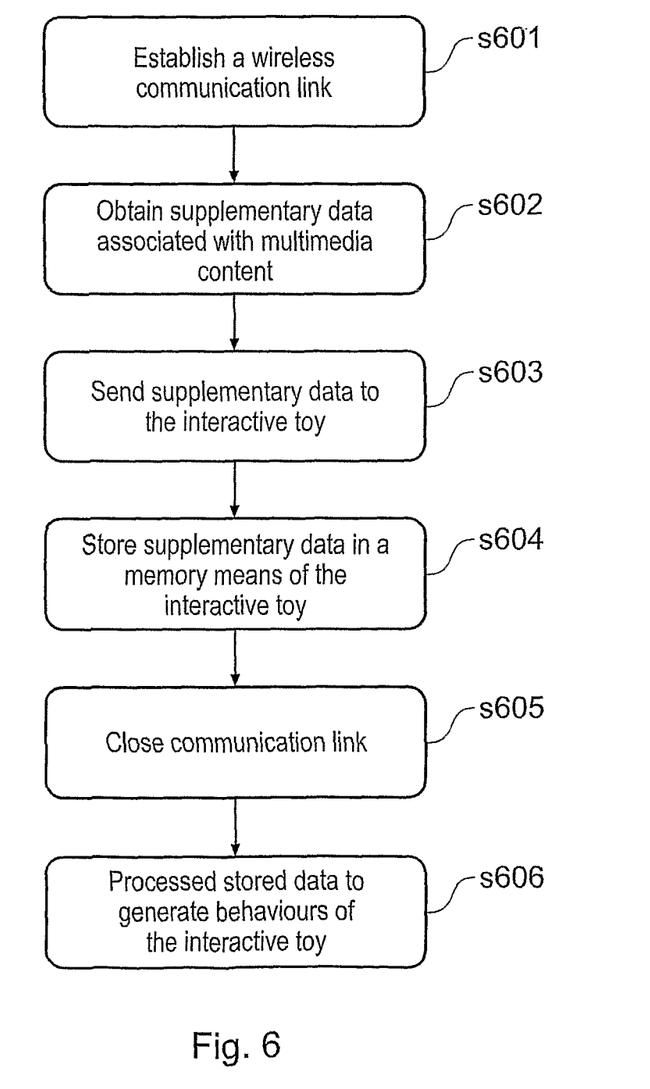
FIG. 6 is a flow diagram of a method of modifying the behaviour of an interactive toy in accordance with an embodiment of the present invention.
Figure 7:
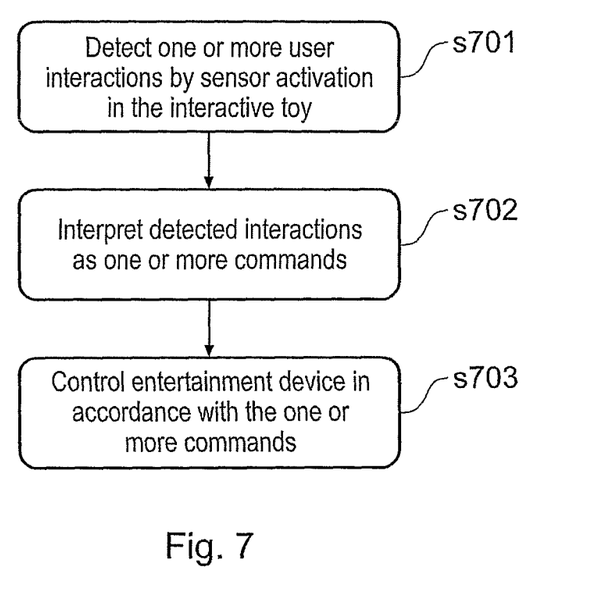
FIG. 7 is a flow diagram of a method of controlling an entertainment device using an interactive toy in accordance with an embodiment of the present invention.

Corresponding methods of operation of the entertainment device and interactive toy are now disclosed with reference to FIGS. 5, 6 and 7.

Referring to FIG. 5, a method of interaction between an entertainment device and an interactive toy comprises a first step s501 of establishing a wireless communication link between the entertainment device and the interactive toy. Either the toy or the entertainment device can initiate the link. In a second step s502, a data request is sent from the entertainment device to the interactive toy via the communication link. In a third step s503, data descriptive of characteristics of the interactive toy is provided for transmission. In a fourth step s504, data descriptive of characteristics of the interactive toy is sent from the interactive toy to the entertainment device via the communications link. In a fifth step s505, the entertainment device generates one or more interaction control signals for transmission to the interactive toy via the communication link in which the one or more interaction control signals are responsive to the characteristics of the interactive toy.

It will be apparent to a person skilled in the art that variations in the above method correspond to operation of the various embodiments of the apparatus disclosed herein are considered within the scope of the present invention, including but not limited to selecting characteristics from one or more selected from the list consisting of: physical capabilities of the interactive toy; target age-range of a user of the interactive toy; licensing type of the interactive toy; personality type of the interactive toy; the apparent gender of the toy; and the name of the toy.

Referring to FIG. 6, a method of modifying the behaviour of an interactive toy comprises a first step s601 of establishing a wireless communication link between the entertainment device and the interactive toy followed in a second step s602, by the entertainment device obtaining supplementary data associated with media content mounted on the entertainment device. In a third step s603, the supplementary data is sent to the interactive toy via the communication link. In a fourth step s604, the supplementary data is stored in a memory means of the interactive toy. In a fifth step s605, the communication link is closed. In a sixth step s606, stored data is processed to generate behaviours of the interactive toy in which the supplementary data received by the interactive toy affects subsequent behaviour of the interactive toy.

It will be apparent to a person skilled in the art that variations in the above method correspond to operation of the various embodiments of the apparatus disclosed herein are considered within the scope of the present invention, including but not limited to transmitting data descriptive of the characteristics of the interactive toy from the interactive toy to the entertainment device prior to transmitting supplementary data to the interactive toy, in which the supplementary data transmitted by the entertainment device is responsive to the data descriptive of the characteristics of the interactive toy previously transmitted to the entertainment device.

Referring to FIG. 7, a method of controlling an entertainment device using an interactive toy comprises a first step s701 of detecting one or more interactions of a user with the interactive toy through one or more sensors of the interactive toy. In a second step s702 the detected interactions are interpreted (either by the toy, or by the device, or partly by each) as one or more commands corresponding to functions of the entertainment device. In a third step s703, the entertainment device is controlled in accordance with the one or more commands.

It will be apparent to a person skilled in the art that variations in the above method correspond to operation of the various embodiments of the apparatus disclosed herein are considered within the scope of the present invention, including but not limited to:

initially transmitting data descriptive of the characteristics of the interactive toy previously to the entertainment device from the interactive toy and mapping sensor activations to control commands in a manner responsive to the data descriptive of the characteristics of the interactive toy; and     performing such mapping in the entertainment device; or performing such mapping in the interactive toy.

It will be appreciated that in embodiments of the present invention, elements of the various methods of operation of the entertainment device and the interactive toy may be implemented by for example reprogramming one or more processors therein. As such the required adaptation may be implemented in the form of a computer program product comprising processor implementable instructions stored on a data carrier such as a floppy disk, optical disk, hard disk, PROM, RAM, flash memory or any combination of these or other storage media, or transmitted via signal on a network such as an Ethernet, a wireless network, the Internet or any combination of the these or other networks.

The invention claimed is:

1. An entertainment device, comprising:
    a wireless receiver arranged in operation to receive data descriptive of physical capabilities of an interactive toy from the interactive toy;
    a processor to generate interaction signals;
    a wireless transmitter arranged in operation to transmit interaction signals to the interactive toy;
    a non-transitory storage medium reader for reading media content and associated supplementary data from a storage medium;
    a media content player for generating a video signal for display by a display; and
    a processor to generate data signals from the supplementary data;
    and in which:
    the generated interaction signals are responsive to the data descriptive of the physical capabilities of the interactive toy, and
    the entertainment device is arranged in operation to transmit the generated data signals to the interactive toy when in a communication mode with the interactive toy, and in which the data is responsive to the data descriptive of the physical capabilities of the interactive toy received from the interactive toy and is for use by the interactive toy when the interactive toy is no longer in communication with the entertainment device.

2. An entertainment device according to claim 1, wherein:
    the generated interaction signals are based upon some or all of the supplementary data.

3. An entertainment device according to claim 1, in which the generated interaction signals are further responsive to one or more selected from the list consisting of:
    i. a target age-range of a user of the interactive toy;
    ii. a licensing type of the interactive toy;
    iii. a personality type of the interactive toy;
    iv. an apparent gender of the toy;
    v. an apparent age of the toy;
    vi. a name of the toy; and
    vii. a physical appearance of the toy.

4. An entertainment device, comprising:
    a wireless receiver arranged in operation to receive data descriptive of physical capabilities of an interactive toy from the interactive toy;
    a processor to generate interaction signals;
    a wireless transmitter arranged in operation to transmit interaction signals to the interactive toy;
    a non-transitory storage medium reader for reading media content data from a storage medium;
    a media content player for generating a video signal for display by a display; and
    a processor arranged in operation to interpret data signals from the interactive toy to control one or more aspects of operation of the media content player;
    and in which:
    the generated interaction signals are responsive to the data descriptive of the physical capabilities of the interactive toy, and
    the processor is operable to establish a mapping of control commands to some or all of the available sensors of the interactive toy responsive to the data descriptive of the capabilities of the interactive toy as previously transmitted to the entertainment device by the interactive toy.

5. A method of interaction between an entertainment device and an interactive toy, comprising:
    establishing a wireless communication link between the entertainment device and the interactive toy;
    sending a data request from the entertainment device to the interactive toy via the communication link;
    providing data descriptive of capabilities of the interactive toy for transmission;
    sending data descriptive of capabilities of the interactive toy from the interactive toy to the entertainment device via the communications link; and
    generating one or more interaction control signals for transmission to the interactive toy via the communication link, the one or more interaction control signals are responsive to the capabilities of the interactive toy;
    obtaining supplementary data associated with media content mounted on the entertainment device;
    sending supplementary data from the entertainment device to the interactive toy via the communication link, the supplementary data transmitted by the entertainment device being responsive to the data descriptive of the capabilities of the interactive toy transmitted to the entertainment device;
    storing the supplementary data in a memory of the interactive toy;
    closing the communication link; and
    processing stored data to generate behaviors of the interactive toy; in which the supplementary data received by the interactive toy affects subsequent behavior of the interactive toy.

6. A method according to claim 5, in which the step of establishing a wireless communication link between the entertainment device and the interactive toy comprises in turn the step of determining a valid identity of the interactive toy.

7. A method of interaction between an entertainment device and an interactive toy, comprising:
- establishing a wireless communication link between the entertainment device and the interactive toy;
- sending a data request from the entertainment device to the interactive toy via the communication link;
- providing data descriptive of capabilities of the interactive toy for transmission;
- sending data descriptive of capabilities of the interactive toy from the interactive toy to the entertainment device via the communications link; and
- generating one or more interaction control signals for transmission to the interactive toy via the communication link, the one or more interaction control signals are responsive to the capabilities of the interactive toy;
- detecting one or more interactions of a user with the interactive toy through one or more sensors of the interactive toy;
- mapping sensor activations to control commands in a manner responsive to the data descriptive of the capabilities of the interactive toy in order to interpret the detected interactions as one or more commands corresponding to functions of the entertainment device; and
- controlling the entertainment device in accordance with the one or more commands.

8. A method according to claim 7, in which the mapping is established by the entertainment device.

9. A method according to claim 7, in which the mapping is established by the interactive toy.

10. A data carrier comprising non-transitory computer readable instructions that, when executed by a computer cause the computer to operate as an entertainment device according to claim 1.

11. A data carrier comprising non-transitory computer readable instructions that, when executed by a computer cause the computer to carry out the method of claim 5.

* * * * *